United States Patent [19]

Smith

[11] 4,402,113

[45] Sep. 6, 1983

[54] FLEXIBLE CLAMP FOR HOSE, CABLE AND THE LIKE

[75] Inventor: Donald J. Smith, Woodland Hills, Calif.

[73] Assignee: Communications Technology Corporation, Los Angeles, Calif.

[21] Appl. No.: 335,738

[22] Filed: Dec. 30, 1981

[51] Int. Cl.³ ............................ B65D 63/02; F16L 33/00
[52] U.S. Cl. ............................ 24/20 R; 24/23 R; 24/279; 24/280; 285/367; 285/411; 285/420
[58] Field of Search .................. 24/20 R, 274 R, 281, 24/282, 280, 20 CW, 23 R, 279, 284; 285/367, 285/411, 420

[56] References Cited

U.S. PATENT DOCUMENTS

| | | | |
|---|---|---|---|
| 1,112,781 | 10/1914 | Frazee | 24/282 |
| 2,395,745 | 2/1946 | King | 24/279 |
| 2,717,788 | 9/1955 | Raynes | 285/420 |
| 3,635,506 | 1/1972 | Womble et al. | 285/411 |
| 4,308,648 | 1/1982 | Fay | 24/274 R |

FOREIGN PATENT DOCUMENTS

| | | | |
|---|---|---|---|
| 7928785 | 6/1981 | France | 24/20 R |
| 836036 | 6/1960 | United Kingdom | 24/279 |
| 1122039 | 7/1968 | United Kingdom | 24/279 |

Primary Examiner—Gene Mancene
Assistant Examiner—James Hakomaki
Attorney, Agent, or Firm—Harris, Kern, Wallen & Tinsley

[57] ABSTRACT

A flexible clamp for hose, cable and the like in the form of a strip with opposite ends joined to produce a band. A portion of the strip is formed into parallel sections with at least one section having a corrugated shape and with another section having a variable length, non-corrugated, and conforming to the shape of the band, with this section having a plurality of overlapping tongues providing a substantially continuous portion of the band. In use, the corrugated section provides flexibility for the clamp permitting change of clamp circumference with temperature cycling and the like.

3 Claims, 6 Drawing Figures

U.S. Patent  Sep. 6, 1983  4,402,113
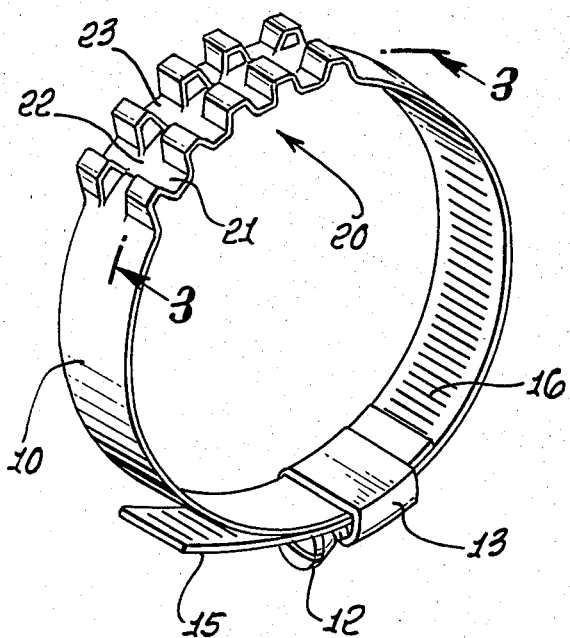
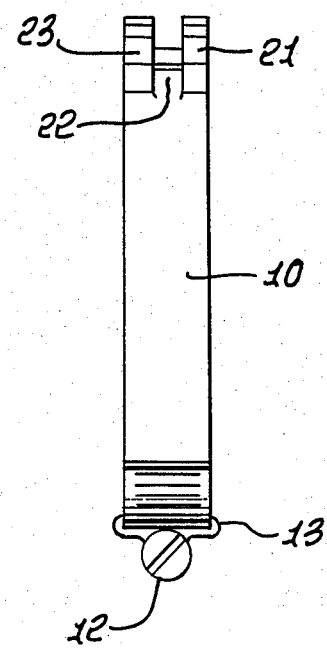
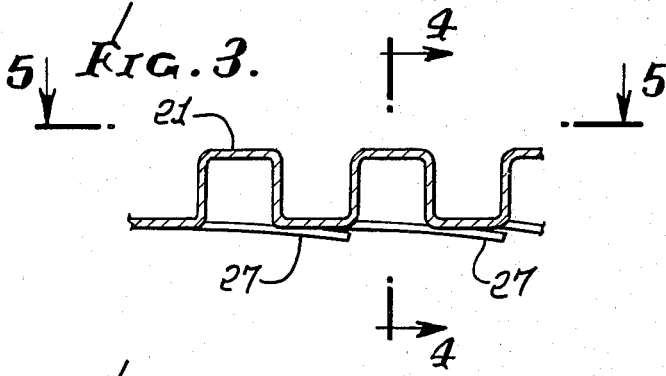
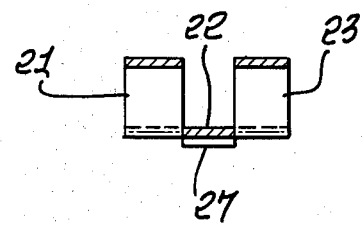
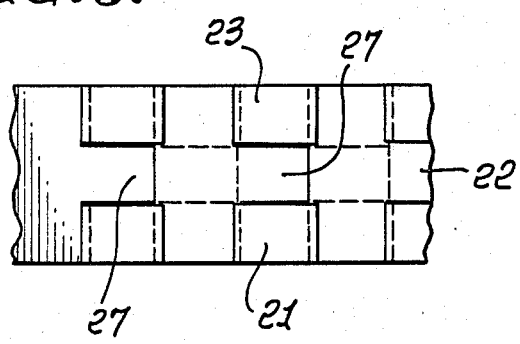
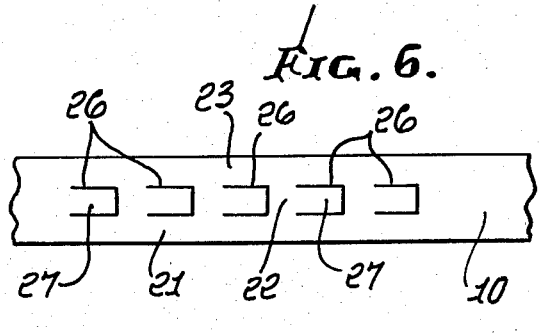

FLEXIBLE CLAMP FOR HOSE, CABLE AND THE LIKE

BACKGROUND OF THE INVENTION

This invention relates to hose and cable clamps and the like, and in particular to a new and improved clamp which is flexible so as to permit change in clamp circumference with temperature cycling and the like without damage to the item being clamped or the clamp itself.

A wide variety of hose and cable clamps are presently available and typically comprise a strip formed into a band with some means for joining the ends of the strip and obtaining adjustment of the circumference of the band.

One prior art band is shown in U.S. Pat. No. 1,713,998 wherein the strip itself is corrugated to provide flexibility. Alternative forms of strip corrugations are shown in U.S. Pat. Nos. 3,475,793 and 3,523,337. Clamps with a resilient section, typically a spring at the junction of the ends of the strip, are shown in U.S. Pat. Nos. 1,819,768; 2,659,954; 2,730,612; 2,897,569; and the previously mentioned U.S. Pat. Nos. 3,475,793 and 3,523,337. Another form of resilient construction is shown in U.S. Pat. No. 3,708,834 wherein the entire band is made of a stretchable material. One non-resilient form of clamp or tie is shown in U.S. Pat. No. 3,964,133.

It is an object of the present invention to provide a new and improved flexible clamp which will have a substantially continuous tension with expansion and contraction of the item being clamped, and at the same time which will provide a continuous band about the item, both features being desirable for reducing the likelihood of leaking past the clamp.

It is a particular object of the invention to provide a new and improved flexible clamp suitable for clamping plastic protective boots over telephone cable splices which are subjected to extremes of ambient temperature to maintain a leak-tight clamp without damage to the plastic boot.

It is another object to provide such a flexible clamp having a portion with parallel sections with one or more sections corrugated to provide the resilient characteristic and with another section non-corrugated and of a variable length to provide the continuous band characteristic.

Other objects, advantages, features and results will more fully appear in the course of the following description.

SUMMARY OF THE INVENTION

A flexible clamp for hose, cable and the like in the form of a strip having opposite ends joined to form a band, with a portion of the strip having parallel sections with one section having a corrugated shape and with another section having a variable length and conforming to the band. A flexible clamp with the variable length section including a plurality of tongues carried by the corrugated section and with the tongues overlapping one another in sequence to provide a substantially continuous portion for the band. A flexible clamp with the variable length section between corrugated sections and separated by a plurality of U-shaped slits forming the overlapping tongues.

BRIEF DESCRIPTION OF THE DRAWING

FIG. 1 is a perspective view of a cable clamp incorporating the presently preferred embodiment of the invention;

FIG. 2 is a side view of the clamp of FIG. 1;

FIG. 3 is an enlarged partial sectional view taken along the line 3—3 of FIG. 1;

FIG. 4 is a sectional view taken along the line 4—4 of FIG. 3;

FIG. 5 is a top view taken along the line 5—5 of FIG. 3; and

FIG. 6 is a plan view of a portion of the strip forming the clamp of FIG. 1, showing the preferred slitting pattern.

DESCRIPTION OF THE PREFERRED EMBODIMENT

The clamp shown in FIGS. 1 and 2 is formed of a strip 10 of stainless steel, although other materials may be utilized if desired. The strip is formed into a generally circular band with the ends of the strip overlapping, and some means is provided for joining the ends. Once conventional configuration is shown in FIGS. 1 and 2 and includes a screw 12 mounted in a carrier 13 which is fixed to one end of the strip 10. The other end 15 of the strip 10 passes through the carrier 13 between the end 14 and the screw 12, with the screw engaging slots 16 for adjusting the circumference of the band by rotating the screw. Other mechanisms for joining the ends of the strip and for adjusting the band circumference may be utilized as desired.

A portion 20 of the strip 10 is divided into parallel sections 21, 22, 23, with the section 22 between the sections 21, 23, and with the sections 21 and 23 having the same configuration.

The sections 21 and 23 are formed into a corrugated pattern to provide a resilient or spring-like characteristic for the band. The section 22 has a variable length and conforms to the generally circular shape of the band. This configuration may be achieved by slitting the strip 10 while in a flat configuration with a series of U-shaped slits 26, as shown in FIG. 6. Then the section 22 comprises a sequence of tongues 27 carried by the sections 21, 23. When the sections 21 and 23 are bent to the corrugated configuration, the tongues 27 of the section 22 overlap one another in sequence, as seen in FIG. 3, to provide a substantially continuous portion for the band. After the slitting and corrugating operations, the connector components may be attached to the ends of the strip and the strip then formed into the band. Alternatively, the clamp of the present invention may be produced by utilizing a completed conventional clamp already in the band configuration. The clamp may be slitted and corrugated while in the circular band shape, or may be opened up to a flat position, slitted and corrugated, and then again formed into the band shape.

With the clamp of the present invention, the corrugated sections 21, 23 provide the necessary resilience or spring characteristic, while the section 22 provides the continuous band for the continuous clamping pressure about the entire circumference of the clamp. While one continuous section and two corrugated sections are illustrated, it will be understood that one continuous section and one corrugated section is all that is necessary, and that two or more of each type of section may be utilized if desired.

I claim:

1. A flexible clamp for hose, cable and the like comprising
a single strip having opposite ends and means for joining said ends to form said strip into a band,
with a portion of said strip having first and second parallel sections as integral parts of said strip,
with said first section having a corrugated shape and with said second section having a variable length and conforming to the curvature of said band,
said second section comprising a plurality of sequentially overlapping tongues defining a substantially continuous inner surface for said band.

2. A flexible clamp as defined in claim 1 including a third section parallel to said first and second sections, with said third section having a corrugated shape corresponding to that of said first section, and with said second section between said first and third sections.

3. A flexible clamp for hose, cable and the like comprising:
a single strip having opposite ends and means for joining said ends to form said strip into a band,
with a portion of said strip having first, second and third parallel sections as integral parts of said strip,
with said second section separated from said first and third sections by a plurality of U-shaped slits,
with each of said first and third sections having a corrugated shape and with said second section positioned between said first and third sections and having a variable length and including a plurality of sequentially overlapping tongues defining a substantially continuous curved inner surface for said band.

* * * * *